Patented June 24, 1930

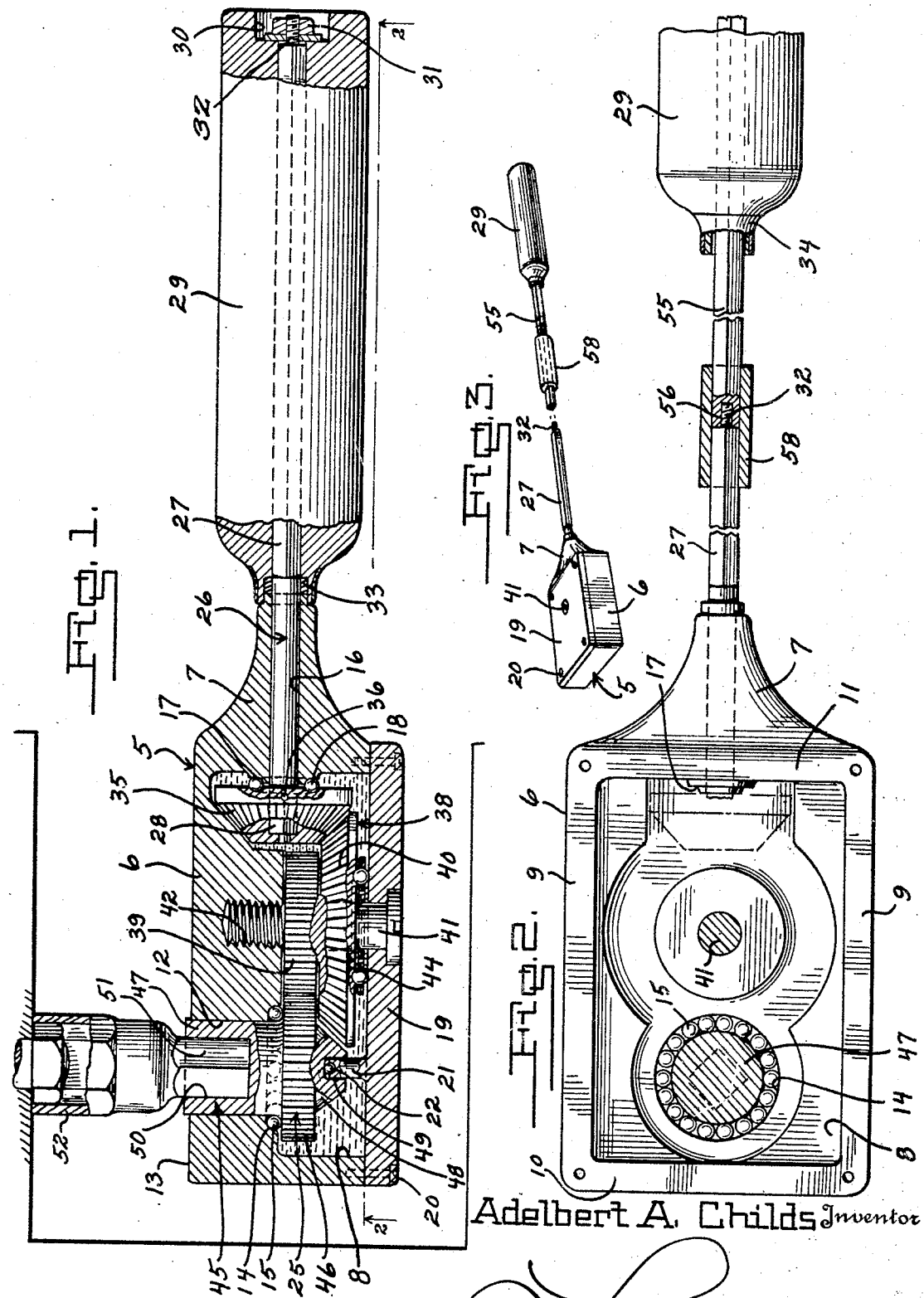

1,767,434

UNITED STATES PATENT OFFICE

ADELBERT A. CHILDS, OF ORLEANS, MASSACHUSETTS

RIGHT-ANGLE SOCKET STOCK

Application filed March 5, 1928. Serial No. 259,264.

The present invention relates to improvements in tools for tightening or loosening nuts or bolts, driving or removing screws and the performing of similar operations, and the primary object of the invention is to provide an improved socket stock which will be found especially useful in the assembling or repairing of machinery wherein the nuts and bolts are so located at inaccessible places as to prevent the use of ordinary tools.

A further object of the invention is to provide an improved right-angle socket stock for adjusting bolts, nuts, screws, etc., at locations inaccessible to the ordinary screw driver or wrench, and embodying an arrangement whereby the tool holding member will be rotated in a corresponding direction to that in which the operating handle is rotated.

A still further object of the invention is to provide a right-angle socket stock embodying a novel driving gear arrangement whereby rotation of the handle member will operate to rotate in a like direction, a tool receiving member having its axis extending at a right angle to the axis of the handle member.

A still further and important object of the invention is to provide a right-angle socket stock embodying novel features of assembly, one which will be strong and durable, and one wherein the transmission means between the drive member and tool holding member may be enclosed in such manner as to insure efficient lubricating features and thus rendering the device easy of operation.

Other objects and advantages of the invention will be apparent during the course of the following detailed description, taken in connection with the accompanying drawing, forming a part of this specification and in which drawing:

Figure 1 is a central longitudinal section thru the improved socket stock and showing a tool carried by the stock for adjusting a bolt disposed between two closely related objects.

Figure 2 is a view taken substantially on the line 2—2 of Figure 1, showing the cover plate and certain of the gear members removed and showing an extensible means for the operating shaft.

Figure 3 is a perspective view of the device.

Referring to the drawing in detail, and wherein similar reference characters designate corresponding parts thruout the several views, the numeral 5 designates the head portion of the socket stock comprising a substantially rectangular-shaped body portion 6 provided at its rear end with a tapering shank portion 7. The body portion 6 at one face thereof is recessed as at 8 providing side walls 9 and front and rear walls 10 and 11 respectively. The body portion 6, adjacent the forward wall 10 is provided with a bore 12 extending from the upper face 13 into the recess 8 with the axis of the bore extending in right angular relation to the axis of the tapering shank 7. This bore 12 as its inner end is provided with an annular recess 14 forming a raceway for anti-friction balls 15 serving a purpose to be subsequently explained. Extending axially thru the shank portion 7 is a circular bore 16 which opens at its forward end into the recess 8, and formed concentric to the forward end of the bore 16 is a shoulder provided with an annular raceway 17 for receiving anti-friction balls 18.

A cover plate 19 is provided for covering the recess 8 so that a closed chamber is formed in the head 5, and this cover plate preferably rests upon the surface of the walls 9, 10 and 11 and may be secured to the body portion 6 as by means of suitable set screws 20 extending thru each corner of the cover plate. Projecting inwardly from the cover plate 19 and preferably formed integral therewith, is a bearing stud 21 which is slightly recessed at its end for receiving an anti-friction ball 22. This cylindrical bearing stud 21, when the cover plate 19 is connected with the body portion 6, extends co-axially of the bore 12. Thus it will be seen that when the cover plate 19 is associated with the body portion 6, that a chamber is formed, and this chamber is intended to house suitable transmission gearing generally designated by the numeral 25.

Mounted for rotation in the bore 16 of the shank portion 7 is a drive shaft 26 embodying a square-shaped stem portion 27 which projects rearwardly from the shank 7, and provided at the forward end of the drive shaft, to extend into the recess 8, is a squared portion 28. Slidably fitted on the squared stem portion 27 is a hand grip 29 having a square-shaped bore for receiving the stem portion, and the rear end of the hand grip is preferably recessed as at 30 for accommodating a nut 31 threaded upon the reduced terminal portion 32 of the stem portion. The forward end of the hand grip 29 is preferably recessed for receiving a suitable bushing 33 serving to prevent wear at the forward end of the hand grip, and a ferrule 34 encircles the forward end of the hand grip to reinforce the same. The rear end of the shank portion 7 is preferably reduced and projects for a short distance into the hand grip as shown in Figure 1.

Referring now to the transmission gearing 25, the same embodies a bevel drive pinion 35 fitted upon the squared portion 28 of the stem portion 27 and secured thereto as by a suitable pin 36 whereby the pinion is held against longitudinal movement on the shaft and is caused to rotate with the shaft. The rear face of the pinion 35 is preferably provided with an annular race for receiving the anti-friction balls 18. Mounted to revolve about an axis at a right angle to the axis of rotation of the bevel pinion 35, is a compound intermediate gear member 38 embodying a spur gear 39 and a bevel gear 40, said bevel gear 40 to mesh with the bevel drive pinion 35 whereby upon rotation of the drive pinion the intermediate gear member will be rotated. This intermediate gear member 38 is rotatably supported in the chambered body portion by means of a stud screw 41 which extends thru the cover plate 19 and has a threaded inner end for threaded engagement in a threaded bore 42 formed in the body portion 6 in the base of the recess 8. This bore 42 extends at a right angle to the axis of the drive shaft 26 and at the longitudinal center of the head 5. An anti-friction bearing member 44 is disposed about the stud screw 41 between the cover plate 19 and lower face of the intermediate gear member 38 for permitting free rotation of the member and also retaining the bevel gear 40 in proper meshing relation with the bevel drive pinion 35.

Mounted in the head portion 5 forwardly of the intermediate gear member 38, is a rotatable tool receiving gear member 45 embodying a spur gear 46 and an integrally formed hub projection 47 for rotatably fitting within the bore 12. The member 45 at the juncture of the cylindrical projection 47 with the upper face of the gear 46, is rounded off to provide an annular fillet against which the anti-friction balls 15 act to provide an anti-friction bearing for the tool receiving member. An extension 48 is formed at the under side of the gear 46 and provided with a circular pocket 49 arranged coaxial with the axis of the cylindrical projection 47. This pocket 49 receives the bearing stud 21 so that the anti-friction ball 22 engages the bottom wall of the pocket and acts as a thrust bearing for retaining the hub projection 47 against longitudinal movement inwardly thru the bore 12. Formed axially in the hub projection 47 and opening at the outer end thereof, is a polygonal shaped recess or pocket 50 for receiving a polygonal shaped shank portion 51 of a socket 52. While in the example shown a socket wrench has been shown applied to the socket stock, it will readily be apparent that various other types of socket tools having polygonal shaped shank portions may be readily associated with the rotatable tool receiving member 45.

The chamber formed in the head 5 by the recess 8 is preferably filled with a suitable lubricant so that the gearing 25 will be properly lubricated and to render frequent lubricating of the gearing unnecessary. After application of the cover plate 19 it will be seen that a closed chamber is formed for retaining the lubricant.

An arrangement is also provided for allowing lengthening of the squared stem portion 27, and which means preferably consists of an extension bar 55 which is of a like outline in cross section as that of the stem portion 27. The forward end of the bar 55 is provided with a threaded socket 56 for threaded reception of the threaded terminal portion 32 of the stem portion 27 for connecting the extension bar longitudinally of the stem. The hand grip 29 may be slid over the rear end of the extension bar and the extension bar may be provided with a threaded end for receiving the nut 31 to prevent sliding movement of the hand grip off the extension bar. A locking sleeve 58, provided with a square shaped opening, is slidable over the rods 27 and 55, and when slid to a position overlying the joint between the rods, serves to lock the rods so that one is caused to rotate with the other. This sleeve 58 preferably has a slight binding fit to prevent displacement of the sleeve during use of the device. Thus it will be seen that with use of the extension bar 55 that the hand grip 29 may be disposed a greater distance from the head 5 when it is desirable to obtain a greater reach with the socket stock.

In use of the improved device and after insertion of the desired tool member into the socket 50 of the tool receiving member 45, the operator may rotate the hand grip 29 for imparting rotation to the socket tool thru the transmission gearing 25. From Figure 1 it will be noted that when the hand grip 29 is turned in a right hand direction that the socket tool, thru the gearing 25 is also rotated in a right hand direction. That is, when the operator rotates the hand grip 29 in a normal direction for tightening a bolt or nut, the socket tool will also be rotated in a like direction for tightening a bolt or nut. Thus it will be seen that the tool receiving member 45 rotates about an axis at a right angle to the axis of the driving hand grip and will be driven by a rotary motion imparted to the hand grip. While a cylindrical hand grip has been shown for rotating the drive shaft 26, any suitable means such as a crank or flexible drive shaft may be connected to the shaft 26 for rotating the drive pinion 35.

From the foregoing description it will be apparent that an improved type of socket stock has been provided embodying a novel arrangement wherein a socket tool may be supported in the stock at a right angle to the longitudinal axis of the stock and rotated by means of a hand grip so coupled to the socket tool as to cause the tool to be rotated in a like direction as that in which the hand grip is rotated. It will further be apparent that an improved right-angle socket stock has been provided which will be found extremely useful in the tightening and loosening of bolts and nuts located at inaccessible places and not capable of being turned by use of an ordinary type of wrench.

Changes in detail may be made to the form of invention herein shown and described, without departing from the spirit of the invention or the scope of the following claims.

I claim:

1. In a right-angle socket stock, a substantially flat head portion including a body portion being recessed at one face and a shank portion projecting from one end of the body portion, said body portion adjacent its forward end being provided with a bore extending from the recess and opening at the upper face thereof, a removable cover plate closing the lower recessed side of the body portion and having an inwardly projecting bearing stud arranged co-axial with the axis of said bore, a tool receiving member rotatably supported in the head portion by said bore and bearing stud and including a peripherally toothed portion forming a spur gear, a bevel drive pinion fixedly carried by the drive shaft within the recess of the body portion, a compound gear member connecting the drive pinion and spur gear of the tool receiving member, and a hand grip carried by the drive shaft for imparting rotation thereto.

2. In a right-angle socket stock, a substantially flat head portion including a body portion being chambered at its under face and a shank portion extending from one end of the body portion, said body portion adjacent its forward end provided with a bore extending from the recess to the upper face of the body portion, a removable cover plate covering the recess at the lower side of the body portion and forming a closed chamber, said cover plate being provided with an inwardly extending bearing stud arranged to extend co-axially of the axis of said bore and being recessed at its upper end for receiving an anti-friction ball, a total receiving member including a hub projection rotatably mounted in said bore, a peripherally toothed portion forming a spur gear, and an extension below the toothed portion provided with a pocket for receiving the bearing stud, a series of anti-friction balls arranged about the hub projection at the upper side of the peripherally toothed portion, a drive shaft journaled in said shank portion and projecting into the chamber formed in the head portion, a drive pinion carried by the forward end of the drive shaft, a gear member for imparting rotary movement to the tool receiving member and said drive pinion, and means for imparting rotation to said drive shaft.

3. In a right-angle socket stock, a body portion having a recessed lower side and shank portion projecting from one end of the body portion, said body portion being provided adjacent its forward end with a bore opening at the upper side of the body portion, a tool receiving member including a hub projection rotatable in said bore and a spur gear portion, a cover plate closing the lower recessed side of the body portion, a thrust bearing carried by the cover plate for the lower end of the tool receiving member, a drive shaft journaled in said shank portion, a bevel drive pinion carried by the drive shaft, a stud screw extending thru the cover plate and threaded into the body portion between said drive pinion and tool receiving member, an intermediate gear member rotatably mounted on said stud screw including a bevel gear portion for meshing with the drive pinion and a spur gear portion for meshing with the spur gear of the tool receiving member, and means for imparting rotation to said drive shaft.

ADELBERT A. CHILDS.